Patented July 10, 1945

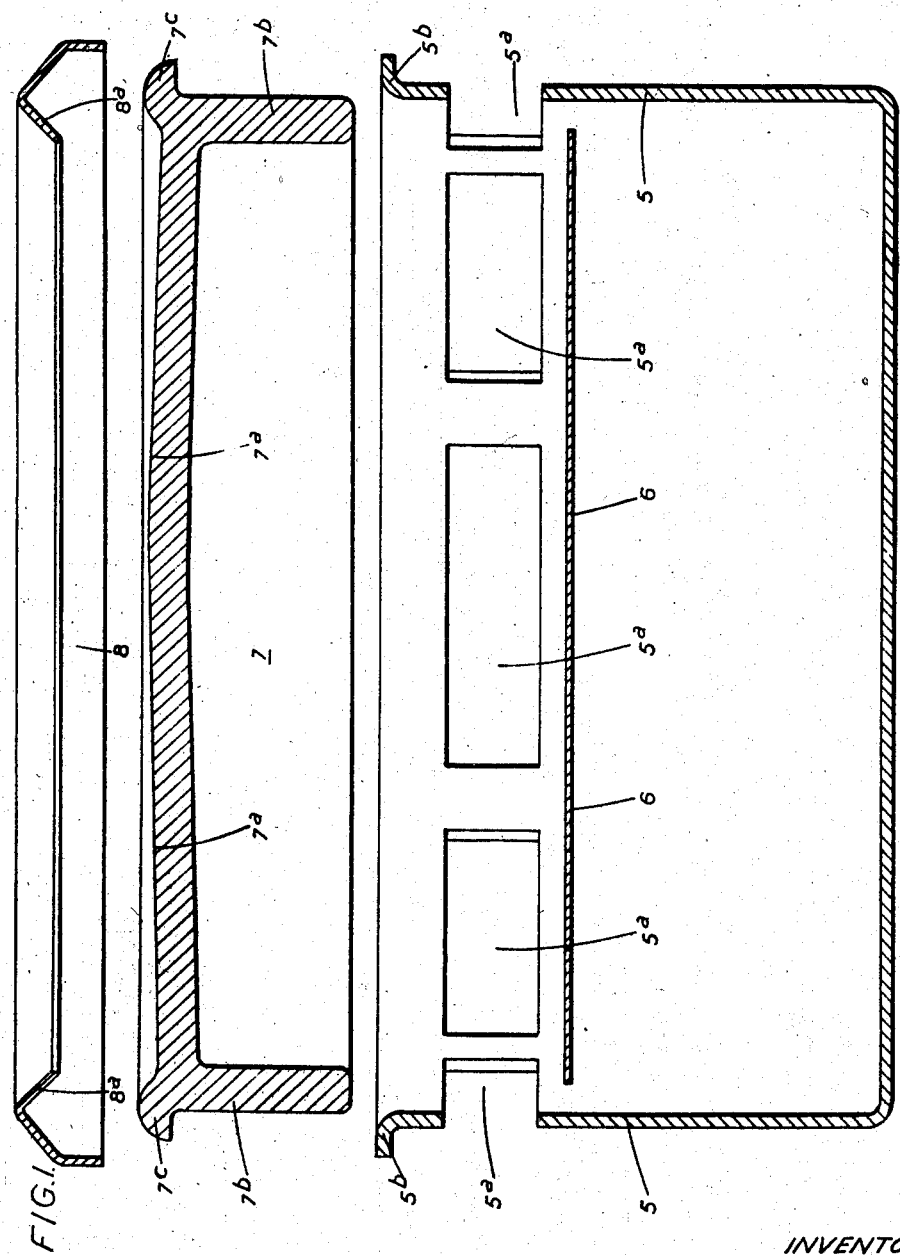

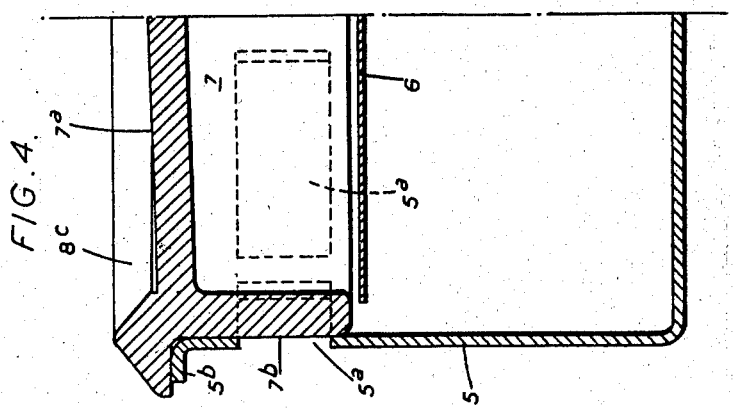
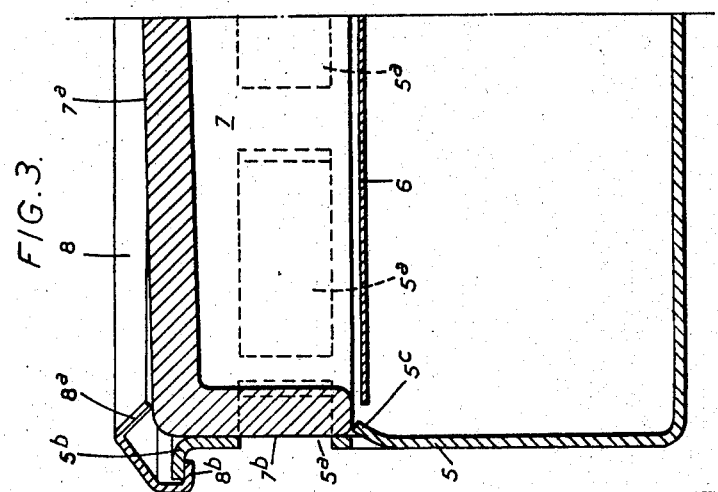
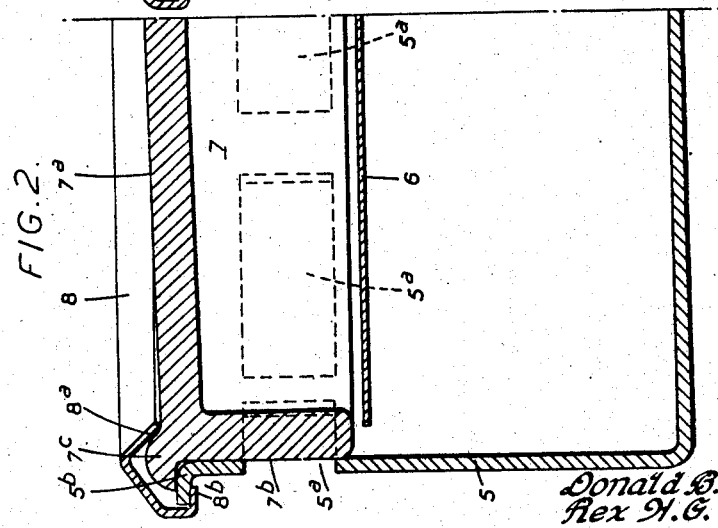

2,379,861

UNITED STATES PATENT OFFICE 2,379,861

COVER FOR THE DIALS OF INSTRUMENTS AND THE LIKE

Donald Bennion Browne, Harpenden, and Rex Henry George Painter, Dunstable, England, assignors to General Motors Corporation, Detroit, Mich., a corporation of Delaware Application February 9, 1945, Serial No. 576,946
In Great Britain November 1, 1943

3 Claims. (Cl. 73—431)

This invention has reference to improvements in covers for the dials of instruments and the like.

It is a known practice in connection with instruments and the like, especially when these are mounted in a panel, to provide for a better illumination of a dial by the employment of "side lighting" through the medium of windows located in that portion of the wall of a casing which is located in front of and which surrounds a dial.

The methods heretofore adapted for "side lighting" have necessitated the provision of several different parts thus adding to the cost of manufacture and assembly and the constructions employed have been favourable to the ingress of moisture and/or dust into the interior of the casing and the present invention has for its object the provision of an improved cover for the dials of instruments and the like which admits of "side lighting" but which is not subject to the objections aforesaid.

According to the invention the improved cover for the dials of instruments and the like is characterised by the formation of the front as an integral unitary structure incorporating a transparent section for covering the front of a dial and a rearwardly directed transparent or translucent flanged section adapted to be associated with the casing so as to provide in conjunction with gapped portions of the casing the means for effecting a "side lighting" of a dial.

The invention will now be described with particular reference to the accompanying drawings which illustrate the invention in its application to a cover for a clock adapted for mounting in the instrument panel of a vehicle or aircraft.

In the drawings:

Figure 1 is a view in vertical section of one embodiment of the invention with the several parts shown separately and indicating the position occupied by the clock face;

Figure 2 is a fragmentary view in vertical section with the parts illustrated in Fig. 1 in the assembled condition;

Figure 3 is a similar view to Fig. 2 but illustrating a modification of the embodiment of the invention as illustrated in Figs. 1 and 2, and Figure 4 is a fragmentary view generally similar to Figs. 2 and 3 but illustrating another embodiment of the invention.

Like numerals of reference indicate similar parts in the several views.

Describing firstly the embodiment of the invention as illustrated in Figures 1 and 2..

The casing 5 of the clock is provided adjacent to the forward end and in advance of the position to be occupied by the clock face 6 with a plurality of gapped portions 5a constituting window apertures and the front of this casing 5 is adapted to be closed by a cover which is designated generally by the reference numeral 7. This cover 7 is constituted by a moulding preferably made from a transparent synthetic plastic material which incorporates a slightly domed front section 7a for covering the clock face 6 and a rearwardly extending annular flange 7b the diameter of which is such that the said flange 7b is a push-fit within the front of the casing 5. Adjacent to the junction of the front section 7a and of the flange 7b there is provided a lip 7c and the depth of the flange 7b is such that when the flange 7b is pushed into the casing 5 until the flat underside of the said lip 7c abuts an outwardly turned flange 5b at the front of the casing the flange 7b covers the window apertures 5a with its rim contained in a plane which is spaced slightly in front of the clock face 6 as is clearly indicated in Figure 2.

The cover 7 is held in position by a bezel 8 the inner edge 8a of which bears on the marginal portion of the front section 7a whilst the outer section is turned inwardly as at 8b to engage below the outwardly turned flange 5b at the front of the casing 5.

In the modification illustrated in Figure 3 the lip 7c is dispensed with and the extent to which the flange 7b is required to be pushed within the casing 5 is determined by inwardly projecting tongues 5c which are pierced out of the annular wall of the casing 5.

According to the embodiment of the invention illustrated in Figure 4, instead of employing a separate bezel 8 the cover 7 is provided with an outstanding circumferential portion 8c which is shaped to conform to the shape of the conventional bezel and the extent to which the flange 7b is required to be pushed within the casing 5 obtains when the base of the bezel-shaped portion 8c abuts the outwardly-turned flange 5b at the front of the casing 5. If desired the bezel-shaped portion 8c may be painted or plated to heighten the illusion that a standard bezel is employed.

If desired, although not illustrated, the cover 7 may be sealed in position by adhesives or employed in conjunction with sealing rings.

It will be appreciated that as a cover 7 as hereinbefore described is an integral unitary structure the number of parts required for instruments and the like which are desired to have a transparent front and side lighting is reduced to a minimum relatively to current practice thus lowering the cost of manufacture and of assembly. Furthermore, the improved front cover 7 is a better protection against the ingress of moisture and/or dust.

Although the invention has been described in its application to a clock, it will be understood that the invention is equally applicable to other instruments such as petrol gauges, oil gauges, ammeters, thermometers, speedometers and the like and that although the invention is particularly suited for use with instruments which are intended to be mounted in a panel, the invention is also capable of application to other instruments, for example, as a cover for the dials of weighing apparatus.

We claim:

1. A casing for a measuring instrument comprising a cup-shaped body which has an apertured lateral wall portion of opaque material near the mouth of said cup-shaped body and which is adapted to receive a dial below said apertured portion, the lower part of said body being devoid of external lateral projections whereby it may be inserted into an instrument panel through an opening of a configuration corresponding to the general contour of said lower part, and an inverted cup-shaped cover secured to said body and closing its mouth, said cover including a transparent base and a transparent side wall portion which extends below and snugly fits said apertured lateral wall portion, whereby the casing is substantially sealed against ingress of moisture and dust between said body and cover and whereby light from a source without the casing may pass through said lateral and side wall portions to the dial and be reflected therefrom through said base.

2. A casing for a measuring instrument comprising a cup-shaped body which has a lateral wall portion formed of opaque material and provided with one or more apertures near the mouth of said body and which is adapted to receive a dial below the apertures, said body being devoid of external lateral surface projections whereby it may be inserted into an instrument panel through an opening of a configuration corresponding to the general contour of said body, a transparent inverted cup-shaped cover closing the mouth of said body, said cover including a side wall portion which snugly fits said lateral wall portion and extends about the apertures, whereby the casing is substantially sealed against ingress of moisture and dust between said body and cover and whereby light from a source without the casing may pass through said lateral and side wall portions to the dial and be reflected therefrom through the base of said cover, and means for maintaining said cover in position relative to said body.

3. A casing for a measuring instrument comprising a cup-shaped body of opaque material having a peripheral flange at its mount and a lateral wall portion formed with one or more apertures, said body being adapted to receive a dial below the apertures, an inverted cup-shaped cover closing the mouth of said body, said cover having a transparent base and a transparent side wall portion within said body, said side wall portion snugly fitting said lateral wall portion and extending about the apertures, whereby the casing is substantially sealed against ingress of moisture and dust between said body and cover and whereby light from a source without the casing may pass through said lateral and side wall portions to the dial and be reflected therefrom through said base, and means securing said cover to said body, said means including means limiting movement of said cover within said body and a bezel encompassing and engaging said cover and said flange.

DONALD BENNION BROWNE.
REX HENRY GEORGE PAINTER.